Figure 1A:
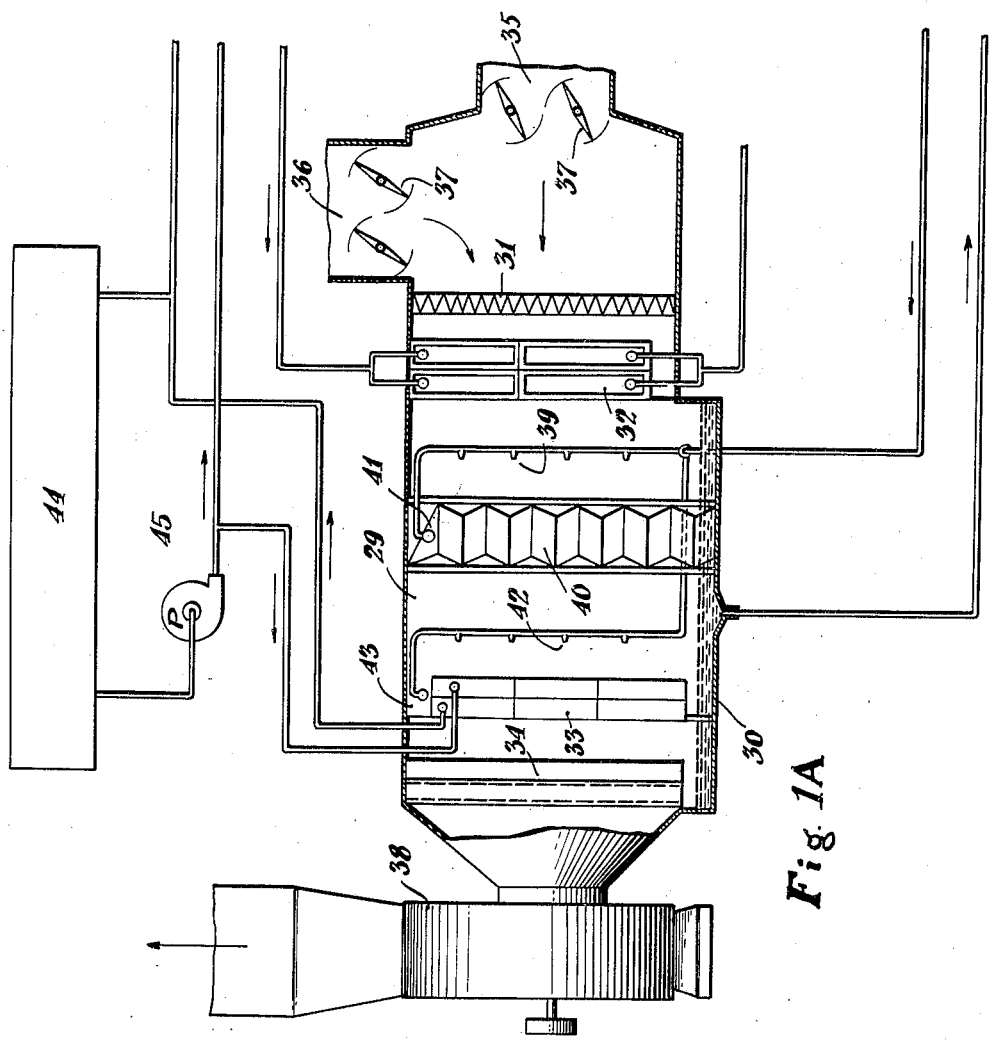

July 13, 1943.   R. BRUNEL   2,324,193
AIR CONDITIONING
Filed June 21, 1940   2 Sheets-Sheet 1

INVENTOR
Richard Brunel
BY
ATTORNEY

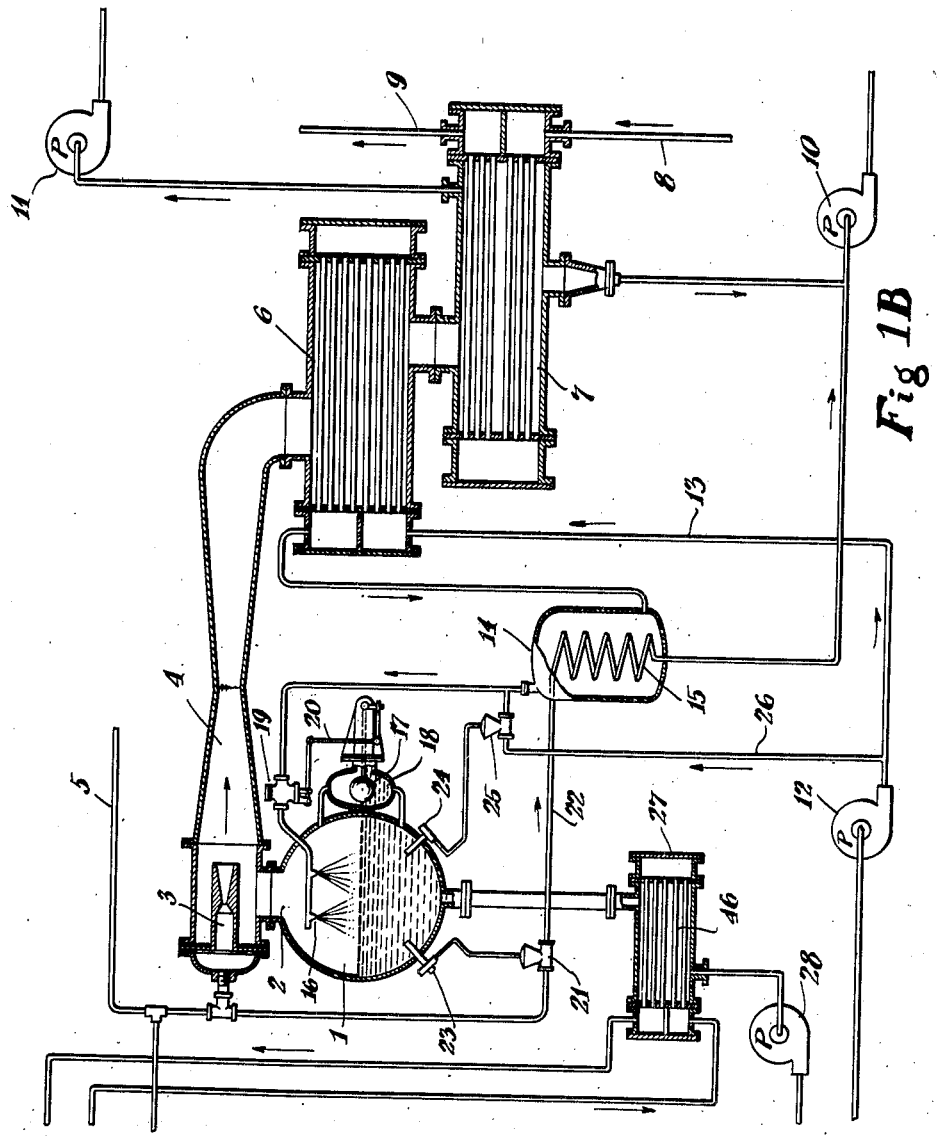

UNITED STATES PATENT OFFICE 2,324,193

AIR CONDITIONING

Richard Brunel, Somerville, N. J.

Application June 21, 1940, Serial No. 341,645

2 Claims. (Cl. 261—3)

The invention relates to a novel and useful process and apparatus for dehydrating hygroscopic solutions and more particularly to a process and apparatus for employing same in the conditioning and dehumidifying of air.

Objects of the invention are to provide a novel and useful process broadly for extracting moisture from a solution containing principally a hygroscopic material such as lithium chloride or other moisture attracting chemical. Another object of the invention is to employ said process and apparatus in connection with the dehumidification of air, and especially in the so-called air-conditioning field. The invention further provides novel and useful mechanism and apparatus for application of the process, and especially in the application thereof to the regeneration or dehydration of hygroscopic chemical solutions used in air-conditioning to remove moisture from air being conditioned.

Air-conditioning is in a technical sense any deliberate and controlled modification of natural air-characteristics within an enclosed space, whether for the improvement of an industrial process or for human comfort. As adapted to the latter use, it consists in manufacturing a healthful, reasonably uniform and comfortable artificial climate appropriate to the current season of the year. Relief from hot-weather discomforts being the only part of the process of which people are distinctly and physically aware, this in the popular mind constitutes the whole of air-conditioning.

When discomfort occurs at the same time as high thermometer readings, it is natural to suppose that cooling the air will correct the condition; but this is true only to a limited extent. The discomfort is actually due to damp garments clinging to the body as a result of conditions which can not be adequately remedied by simple cooling.

The normal healthy body is kept at a constant temperature of 98.4 degrees F. by involuntary physical reactions. When the thermometer climbs in summer the body promptly perspires more freely in its efforts to maintain the constant temperature. High summer temperatures are usually accompanied by high atmospheric moisture content, or high relative humidity, making the air less effective in evaporating perspiration, and to that extent nullifying the body's effort to cool itself. This condition is aggravated by mere cooling, which increases the relative humidity and so further decreases the evaporation rate. Removal of part of the atmospheric moisture, to accelerate evaporation and keep the skin and clothing dry, is far more important and effective than cooling in producing a sensation of comfort and in providing healthful conditions.

Design of an air-conditioning system is necessarily based upon assumptions defining the requirements which must be met. In order that the apparatus may be proportioned to the expected maximum demands, it is planned upon the basis of maintaining a supposedly comfortable combination of room temperature and relative humidity (R. H.) with capacity to absorb predetermined quantities of sensible and latent heat from known sources, when natural atmospheric conditions are at what may be termed "normal extremes." For instance in many localities, design maxima are an outdoor dry-bulb temperature of 95 degrees and a wet-bulb of 75 degrees, although both of these are occasionally exceeded. It has been standard practice, starting with a base temperature of about 72 degrees, to permit an indoor rise of one degree for every three degrees of outdoor rise, so that the thermometer reaches 80 degrees inside when the outside reading reaches 95 degrees. At the same time the indoor R. H. should be gradually reduced to about fifty percent. These maximum indoor conditions have been regarded as comfortable and near enough to the normal extremes of outdoor atmospheric conditions so that no excessive shock results from the effort of physiological adjustment when passing from one condition to the other. More recently, however, it has been determined that adjustment to this maximum difference requires two to three hours; and that in artificially cooled places where the time between entering and leaving is short, the permissible contrast between indoor and outdoor conditions is greatly restricted by the necessity for avoiding sensations of chill or intense heat when passing in or out.

Another source of complaints arises from the sacrifice of comfort to operating economy. In by far the great majority of existing air-conditioning installations, both cooling and dehumidification are performed simultaneously by the use of a cooling medium, sometimes ice ir very cold well-water, but in most cases by mechanical refrigeration. Dehumidification sufficient to maintain even fifty percent R. H. at 80 degrees requires a greater temperature reduction than mere cooling of the air, so that after removal of moisture to even that extent the supply air must be re-heated to a usable temperature. Operating engineers dislike this apparent wastefulness and are inclined to skimp on refrigeration to save expense. As a result, in the usual case the R. H. is higher than it should be and complaints of drafts and cold chills are frequent. So long as refrigeration is the sole dependence for both cooling and dehumidification, this state of affairs will continue.

For greater comfort and health, with natural conditions at the normal extremes, a higher inside temperature and a lower R. H. are recommended. Thus with the previously stated design maxima, an indoor combination of 85 degrees and thirty percent R. H. is suggested. Such conditions are entirely healthful. The smaller temperature difference eliminates practically all possibility of cold shock or chill; and the low R. H. will cause evaporation of perspiration at a rate which will enable full time occupants to perform the duties of sedentary occupations in complete comfort. It is obvious, however, that if the expense of lowering the R. H. to fifty percent by the use of mechanical refrigeration is formidable, the cost of further reducing it (i. e., to thirty percent) by the same means would be prohibitive. Such an advance in air-conditioning practice requires a different and less costly method of dehumidification.

Low atmospheric moisture content is indispensable to the success of many manufacturing processes, and for the safe storage of finished products. Dehumidification of the atmosphere by a method cheaper than refrigeration is advantageous in such circumstances also.

Some progress has already been made in dehumidifying by the use of water solutions of such hygroscopic inorganic chemical compounds as calcium chloride and lithium chloride. The extracted moisture dilutes such a solution and its capacity for further dehumidification is quickly reduced. Before it can be used again it must be re-concentrated or "re-generated." Heretofore the regenerating process has consisted in boiling off the absorbed moisture at temperatures approaching 300 degrees; or of accelerated evaporation at temperatures in excess of 225 degrees. Whichever process is used, the regenerated solution is left so hot as to be unfit for use until its temperature has been greatly lowered. As the useful range of temperature is below 85 degrees the operations of heating the solution to a temperature of 225 degrees or more to expel a small quantity of moisture and then re-cooling it are disproportionately expensive.

The present invention is directed to providing a novel and useful process and apparatus for continuously regenerating hygroscopic liquids and solutions economically and with accuracy of regulation adequate and satisfactory for the applications in which the fluids may be employed. The process is based upon known pressure-temperature characteristics of liquids and solutions, and more specifically upon the known principles that (1) as the pressure upon the surface of a liquid is reduced, the boiling temperature of the liquid is correspondingly lowered; (2) the vapor-pressure of a solution varies as its temperature; and (3) the vapor-pressure of moisture in the atmosphere tends to assume a state of equilibrium with the vapor-pressure of a body of water, or water solution of a hygroscopic chemical, with which it is in contact.

Thus the cycle of steps in my process may be summarized as follows: Air of high temperature and high R. H. is exposed to the cooling and dehumidifying effects of a low-temperature, high-concentration solution of a hygroscopic chemical. The dried and cooled air may then be further reduced in temperature by other means, if desired. The exposure of the hygroscopic solution raises its temperature and dilutes its concentration. Said solution is then further heated and then subjected to the evaporating effect of a sub-atmospheric pressure which materially reduces its temperature and increases its concentration by an intensive evaporating action. Having so restored the solution to its original concentration it may be further cooled as required to bring it to the original temperature.

It will be understood that the foregoing general description and the following detailed description are exemplary and explanatory of the process and invention but are not restrictive thereof.

Referring now in detail to the present embodiment of the invention illustrated by way of example in the accompanying drawings, a preferred form of apparatus embodying my invention is shown diagrammatically in Figures 1a and 1b.

Referring now to the preferred form of the apparatus, as shown by Figures 1a and 1b of the drawings, I provide means for creating a sub-atmospheric pressure by steam condensation and means for subjecting the dilute hygroscopic solution to the evaporating action of that low pressure. As embodied, an evaporating or flash chamber 1 to which at an opening 2 is connected a steam booster consisting of the steam jet nozzle 3 and the ejector 4. From a suitable source steam is supplied through the steam header 5 at a pressure not less than three pounds per square inch (gauge) to the nozzle 3, from which it issues at very high velocity and by aspiration draws in vapors from chamber 1. The entire mass of vapors is compressed within the throat and diffuser of the ejector 4 and discharged into a two-stage condenser, consisting of the chambers 6 and 7, at a pressure high enough to enable condensation by water at a temperature obtainable from an atmospheric cooling tower.

Chamber 6 is a combined condenser and preheater in which condensation is effected by passing through its tubes the used and dilute hygroscopic solution which is to be regenerated, and which, having been cooled as required for use elsewhere, is at this point advantageously used for condensing purposes. Simultaneously the steam which has been used in creating the essential sub-atmospheric pressure in evaporator 1 imparts to the hygroscopic liquid a considerable portion of the heat required for the evaporating and concentrating process which takes place in the evaporator flash chamber. These two reclaiming steps form a favorable contribution to the heat balance and so to the economical performance of the process.

In the chamber 7 condensation is further effected. In the preferred form of the process and apparatus illustrated here, in recognition of the growing necessity for conserving public water supplies, the condensing water is intended to be drawn principally from a cooling tower designed to operate efficiently under atmospheric conditions existing at the place of use. The conditions of the individual problem may however determine that water from another source may be used to greater advantage. The condensing water from whatever source enters the condenser through the inlet 8 and leaves through the outlet 9. The condensate is removed by the pump 10 and delivered to a drain or sewer; or returned to the boiler. Entrained air and residual vapor are compressed to atmospheric pressure by a suitable vacuum pump 11 and discharged to the air.

The dilute solution which is to be regenerated is forced by the pump 12 through the tubes of the condenser preheater 6 and thence through a heater tank 14 in which is a steam coil 15, and is then sprayed into the evaporator 1 through spray nozzles 16. In the preferred form shown, a ball-float 17 in float chamber 18 regulates the admission of the solution and so controls the level of the concentrated solution in the evaporator, by operating the valve 19 through a system of levers 20. It is in this stage of the process that the concentrating is done by inducing low temperature boiling at the reduced pressure maintained in the evaporator. When the amount of heat in the weak solution is properly controlled, the action of extracting excess moisture simultaneously cools the residual concentrated solution to the boiling temperature corresponding to the evaporator pressure, without the use of refrigeration or other external means. This inherent cooling action is an important factor in the cost of economical operation. As a practical illustration an evaporator pressure of 0.3624 inch of mercury will produce hygroscopic solutions of satisfactory concentration at temperatures ranging from 75 degrees to 110 degrees, the temperature depending upon the concentration of the solution. These results can be accomplished only by adequate regulation of evaporator pressure and the amount of heat in the solution entering the evaporator. Satisfactory commercial devices not shown nor necessary to be shown are available for the first of these two requirements.

The amount of heat in the entering solution is regulated by the effluent temperature which for any constant evaporator pressure indicates whether or not the apparatus is functioning as intended.

In the preferred form of apparatus a valve 21 in the steam supply line 22 to heating coil 15 is operated by an immersion thermostat 23 in the concentrated solution within the evaporator. The thermostat is set at the boiling temperature of the desired concentrate corresponding to the evaporator pressure. When the temperature of the concentrate falls, the thermostat causes valve 21 to open and admit steam to the heating coil 15 until the increased effluent temperature and consequent closing of valve 21 indicate that the necessary total heat is present in the entering solution. Another thermostat 24, set at the same temperature as 23, controls valve 25 in pipe 26. When with valve 21 closed the effluent temperature rises above the proper limit, thermostat 24 causes valve 25 to open and thus to permit unheated dilute solution to by-pass the heating equipment and combine with the liquid from tank 14. When the total heat in the mixture is such as to produce effluent of the proper temperature valve 25 will close. The effluent passes from the evaporator into cooling tank 27 from which the pump 28 transmits it to the various points of use.

I provide an apparatus or equipment for using the concentrated hygroscopic solution in the dehumidification of air. In the preferred form shown it consists of a sheet metal chamber or housing 29, of which the bottom forms a tank 30. Within the housing are the principal devices commonly composing a standard air-conditioning apparatus, namely, filters or an electro-static precipitator 31 for removing dirt, dust, soot, smoke and bacteria from the air; heating coils 32 with steam connections for warming the air in winter; cooling coils 33 for cooling the air; and eliminators 34 for intercepting and removing entrained moisture. Outdoor air enters at the intake 35 and return air from the conditioned space enters at 36. Dampers 37 control the admission of fresh and return air in the proper proportions under automatic control of standard instruments not shown. A centrifugal fan 38 draws air through the apparatus and propels it to the conidtioned space.

The concentrated hygroscopic solution after being cooled in tank 27 is sprayed into the air stream through spray nozzles 39 arranged to reach every part of the cross-section of the chamber or housing 29. Closely spaced vertical sheet metal plates 40 wetted with concentrate from flooding nozzles 41 and by spray from nozzles 39 are placed in the air stream to prolong the intimate contact between the air and the hygroscopic fluid. This contact is made more effective by slight deformations in the plates 40 to cause a moderate turbulence, which tends continually to change the air in contact with the wetted surface.

A second set of spray nozzles 42 and flooding nozzles 43 which moisten the cooling coils 33 continue dehumidifying action to completion as desired. At the same time the heat transference of the wetted coils 33 is more efficient than would be the case with dry coils and the cooling of the air is thereby better performed. The used and dilute solution collects in the tank 30 and thence returns to pump 12.

I provide an adequate means or source of cooling 44 from which the pump 45 circulates the cooling medium through the air cooling coils 33 and also through the coils 46 in tank 27 for reducing the vapor pressure of the concentrated hygroscopic liquid to the desired value.

The invention in its broader aspects is not limited to the specific mechanisms and steps shown and described but departures may be made therefrom within the scope of the accompanying claims without departing from the principles of the invention and without sacrificing its chief advantages.

What I claim is:

1. In air-conditioning apparatus in combination means for exposing air of atmospheric temperature and relative humidity to the drying and cooling effects of a hygroscopic chemical solution, a chamber, means comprising a steam condenser for creating a sub-atmospheric pressure in said chamber, means for further heating the used solution comprising means for exchanging heat between the condensing steam and the used solution, means for exposing the used solution to the evaporating effect of said sub-atmospheric pressure, means for chilling the concentrated solution and means for returning the solution concentrated by said evaporation to the first mentioned means.

2. In air-conditioning apparatus in combination means for exposing air of atmospheric temperature and relative humidity to the drying and cooling effects of a hygroscopic chemical solution, a chamber, means comprising a steam condenser for creating a sub-atmospheric pressure in said chamber, means for further heating the used solution, comprising means for exchanging heat between the condensing steam and the used solution, means for exposing the used solution to the evaporating effect of said sub-atmospheric pressure, and means for returning the solution concentrated by said evaporation to the first-mentioned means.

RICHARD BRUNEL.